(12) United States Patent
Namati et al.

(10) Patent No.: US 7,603,013 B1
(45) Date of Patent: Oct. 13, 2009

(54) FIBERSCOPES AND FIBER BUNDLES

(75) Inventors: Eman Namati, Iowa City, IA (US); Jacqueline Thiesse Namati, Iowa City, IA (US); Geoffrey McLennan, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 12/103,563

(22) Filed: Apr. 15, 2008

(51) Int. Cl.
*G02B 6/06* (2006.01)
(52) U.S. Cl. ........................................ 385/116; 385/117
(58) Field of Classification Search ......... 385/115–119; 600/182
See application file for complete search history.

(56) References Cited

U.S. PATENT DOCUMENTS

| | | | |
|---|---|---|---|
| 3,535,018 A | 10/1970 | Vasilatos | |
| 4,790,295 A * | 12/1988 | Tashiro | ........................ 600/176 |
| 6,006,001 A | 12/1999 | Alfano et al. | |
| 6,487,440 B2 | 11/2002 | Deckert et al. | |
| 2001/0012429 A1* | 8/2001 | Wach et al. | .................. 385/115 |
| 2002/0120181 A1 | 8/2002 | Irion | |
| 2006/0051036 A1* | 3/2006 | Treado et al. | ................ 385/117 |
| 2007/0189031 A1 | 8/2007 | Delmar | |

* cited by examiner

*Primary Examiner*—Hemang Sanghavi
(74) *Attorney, Agent, or Firm*—Scott E. Kamholz; Foley Hoag LLP (57) ABSTRACT

An elongate imaging fiber bundle may include a plurality of elongate optical fibers coherently arranged in the bundle, the plurality including peripheral fibers at a periphery of the bundle and deep fibers deep to the peripheral fibers, and a coating surrounding the plurality of fibers. An exposed length of the bundle, intermediate the bundle's proximal and distal ends, may be chemically etched to be denuded of the coating, and peripheral fibers are so severed as to permit injection of light into the peripheral fibers at the exposed length. A fiberscope may include a fiber bundle having an exposed length that is denuded of the coating, and peripheral fibers are so severed in the exposed length as to permit injection of light into the peripheral fibers at the exposed length, and a light source so positioned with respect to the exposed length of the bundle as to inject light into the peripheral fibers at the exposed length.

20 Claims, 6 Drawing Sheets

FIBERSCOPES AND FIBER BUNDLES

SUMMARY

Fiberscopes are described in which both illuminating light and imaging light are transmitted through a single coherent imaging fiber bundle. Fiber bundles are described in which one or more lengths are exposed, as by chemical etching, to permit injection of light into one or more discrete channels in the bundle.

DETAILED DESCRIPTION

Fiberscopes, broadly defined, encompass devices that transmit optical images using optical fiber bundles. Fiberscopes typically have an objective lens positioned at a distal end of the bundle to receive image data from a field of view and a viewing assembly (such as an eyepiece) at a proximal end of the bundle to display the image. The fiber bundles in fiberscopes are typically "coherent," meaning that the arrangement of the individual fibers relative to one another is maintained along the bundle so that the bundle can faithfully transmit an image from one end of the bundle to the other.

Fiberscopes often incorporate a light source positioned to illuminate a field of view; illuminating light reflected from the field of view thereby forms the images. The illuminating light is typically transmitted to the field of view by a second optical fiber (that need not be coherent).

The present disclosure describes fiberscopes in which both the illuminating light transmitted to the field of view and the imaging light received back from the field of view are transmitted through a single optical fiber bundle. The inventors have found that denuding a short length of coherent optical fiber bundle of its coating and severing outer layers of fibers in that length results in an optical fiber bundle in which illuminating light may be injected into the severed outer fibers to illuminate the field, and imaging light may be received by the deeper, undisturbed fibers. An optical fiber bundle prepared in this fashion can then act as a ring light; illuminating light emerges from a peripheral ring at the distal end of the bundle to provide homogeneous illumination to the field of view; and light returning from the field of view is captured by the core fibers for proximal transmission.

Fiberscopes with this arrangement can have diameters less than 5 mm, less than 3 mm, and even less than 1 mm. Consequently, they can reach anatomical (and other) sites of interest too small to be reached by fiberscopes having larger diameters. Larger diameters may be employed as appropriate for other uses, both medical and non-medical.

Fiberscope

Figure 1:
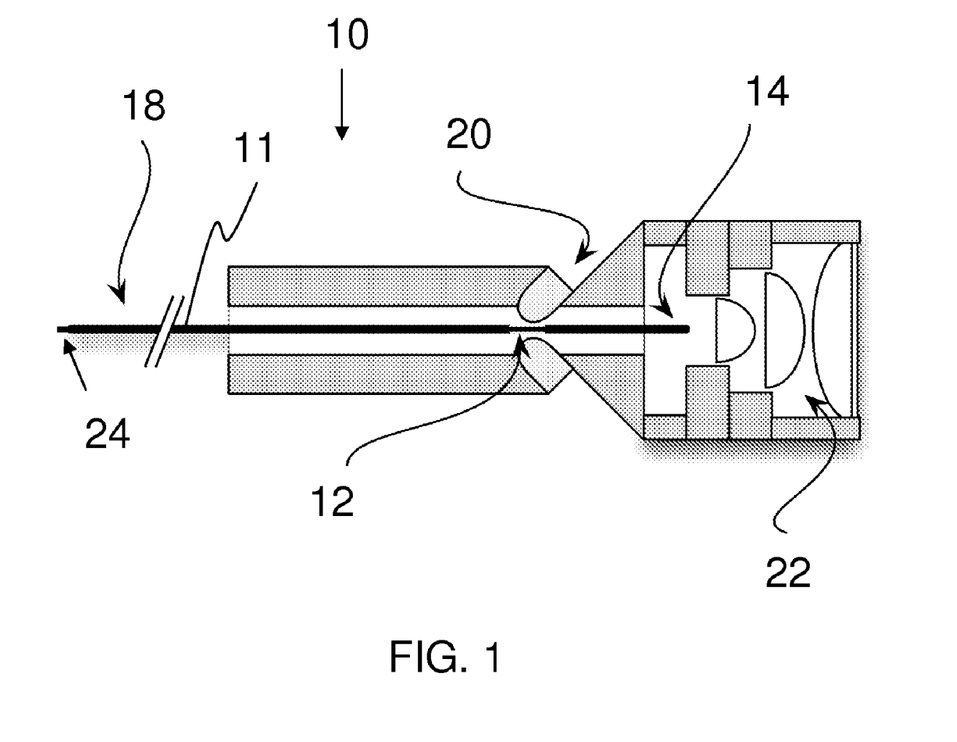
FIG. 1 schematically depicts an example of a fiberscope.

An exemplary fiberscope 10 is shown schematically in FIG. 1. Optical fiber bundle 11 has a length 12 in which peripheral fibers in the bundle are sufficiently exposed as to permit injection of light into them. A viewing assembly, such as optical viewfinder 22, is positioned at proximal end 14 of the bundle. Light source(s) 20 are positioned with respect to the exposed length of the bundle as to inject light into the peripheral fibers at the exposed length. Attached to distal end 18 of the fiber may be an objective lens 24, such as a gradient index lens or micro lens objective.

Figure 1A:
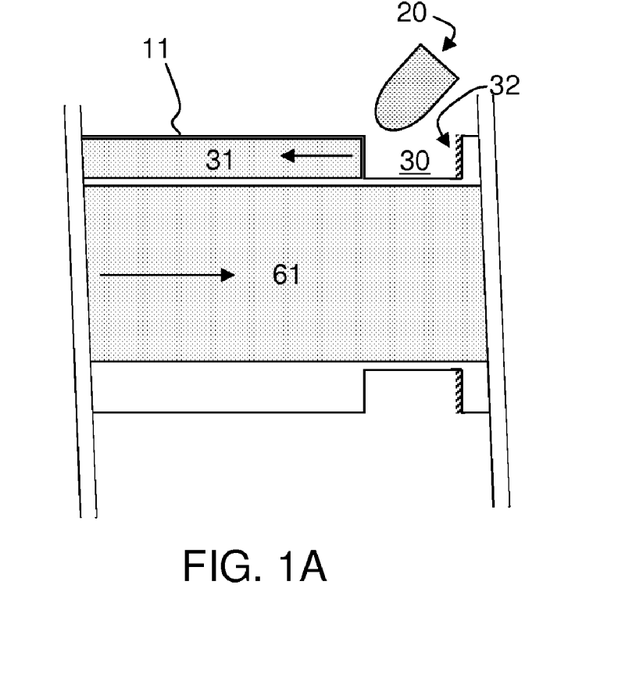
FIG. 1A schematically depicts a modified optical fiber bundle.

FIG. 1A schematically shows some detail of the optical fiber bundle 11. Exposed length 30 is formed in the bundle, thereby defining a channel 31 through which light injected into exposed length 30 from light source 20 may travel. Light may return through center channel 61. An optical seal 32 may be positioned on the proximal side of exposed length 30 to prevent backward propagation of injected illuminating light.

Exposed Length of Fiber Bundle

The coating that typically surrounds a coherent optical fiber bundle is absent in the exposed length, as is the cladding in which the individual fibers are embedded. The fibers themselves may also be severed. The exposed length of the bundle thereby provides a place at which light may be injected into the exposed fibers. The exposed length may be created in a variety of ways; for example, coating and cladding may be omitted from the exposed length during manufacture of the bundle (for example, by masking). Alternatively, coating and cladding may be removed from an initially intact bundle. The material may be removed in a variety of ways, such as mechanical stripping, chemical etching, melting, etc. The inventors have found that chemical etching with hydrofluoric acid is one suitable method. An exemplary method is described later. The peripheral fibers may similarly be severed in a variety of ways, such as incising with a blade, scraping, milling, chemically dissolving, etc.; the severing process may occur as part of the preparation (for example, a single chemical etching process can be used to remove the coating/cladding and sever the fibers).

Exposure should not penetrate the entire depth of the bundle (otherwise the bundle would be severed). Moreover, in order to achieve the "ring light" arrangement, the exposure should penetrate to a depth sufficient to provide the ring light thickness desired. The ring thickness may be in the range of up to 20% of the bundle radius; up to 10%, from about 5% to about 15%, from about 1% to about 20%, about 1%, about 2%, about 5%, about 10%, about 15%, or about 20%.

Light injected into the exposed (peripheral) fibers may travel distally or proximally along those fibers. As proximal light propagation may be undesirable (as it would not convey any image information), the ends of exposed fibers may be optically sealed proximal to the exposed length of the bundle, such as by opaque heat shrink tube or other treatment that prevents light propagation.

Single or multiple channels of a desired thickness are created without severing the entire bundle. To create multiple channels, the exposure preparation may be confined to only a portion of the exposed length, such as an arc of the bundle's circumference, for each channel that is desired. Portions may be protected from the exposure preparation be preventing physical contact, such as by masking the regions to be excluded.

Figure 10:
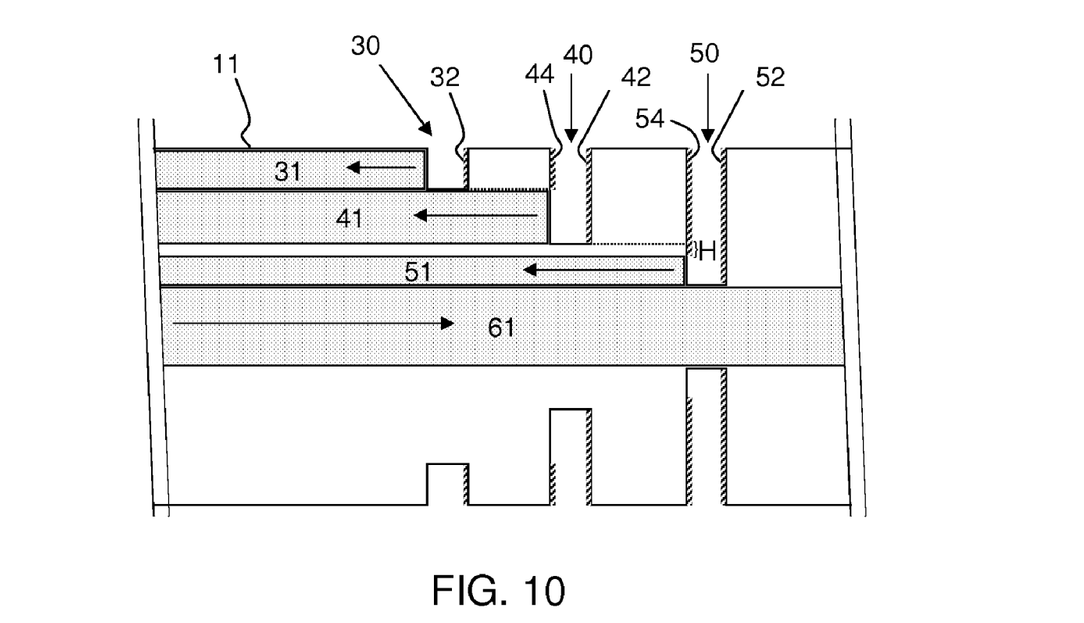
FIGS. 10-11 schematically depict examples of optical fiber bundles having more than one exposed length.
Figure 11:
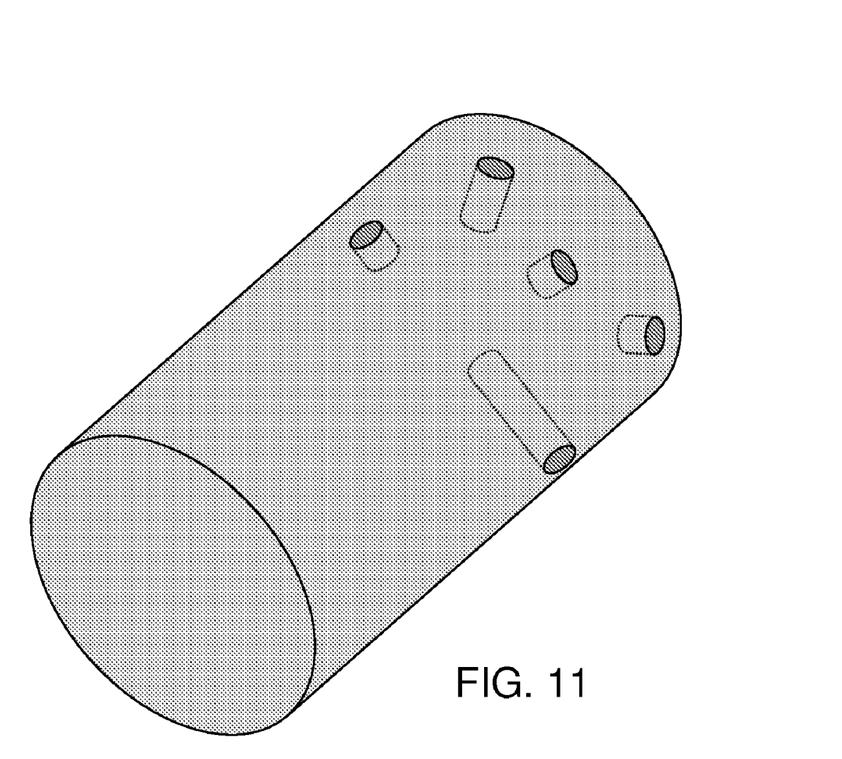

Examples of bundles having multiple exposed lengths are shown in FIGS. 10-11. If optically insulated from one another, the multiple exposed lengths can be used to create multiple light channels within the bundle; each channel can be used with a distinct light source to provide a variety of illuminations.

In FIG. 10, three exposed lengths 30, 40, and 50 are formed in the fiber bundle 11 with increasing depths (which are greatly exaggerated in the drawing to help illustrate certain features). Light sources (not shown) may be positioned to shine light into the exposed lengths and along the respective channels 31, 41, and 51. To prevent spilling of light between channels, exposed fiber ends in the exposed lengths may be optically sealed. For example, seal 32 and/or seal 44 (one should suffice) may be used to insulate channel 31 from channel 41; similarly, seal 42 and/or seal 54 may be used to insulate channel 41 (and 31) from channel 51. A seal may extend longer than the length of an adjacent exposed length (for example, by overhang H) to help ensure complete light insulation.

FIG. 11 shows another exemplary embodiment of a fiber bundle having multiple channels. In this embodiment, exposed lengths are formed as localized bores B (such as pinholes). They can extend to different depths and are typically separated from one another by undisturbed bundle and may be positioned about the circumference and/or along the length of the bundle. The cladding separating the bores provides light insulation between the channels defined by the bores. Bores may be arranged helically along the bundle.

Light Source

Light source(s) are positioned with respect to the exposed length of the bundle as to inject light into the peripheral fibers at the exposed length. A wide variety of light sources may be used. Light-emitting diodes (LEDs) reliably provide bright light in a small size with comparatively little energy consumption. LEDs emitting white light are suitable for standard imaging techniques; LEDs emitting infrared light, near infrared light, ultraviolet light, or selected bands of visible light may be preferred for certain applications.

Objective Lens

An objective lens may be positioned at the distal end of the bundle to collect light emanating from the field of view and transmit the light through the core fibers in the bundle. The lens may be a gradient index (GRIN) lens. A micro lens objective could be used instead of a GRIN lens. Alternatively, a lens may be omitted. If no lens is mounted the distal end may be used as a surface probe for spectroscopy (visible, near infrared, Raman, etc.). The lens may be sized, shaped, and positioned so that it directs received light into deep (core) fibers and not into peripheral fibers. It may be so sized, shaped, and positioned as not to obscure light emitted from peripheral fibers.

Applications

Fiberscopes made as described herein may be especially well suited to submillimeter applications, i.e., applications requiring a fiberscope that has submillimeter diameter, and applications requiring a high degree of fiberscope flexibility. Medical applications include deep penetration of the bronchial tree (conventional bronchoscopes are size-limited to the 10th generation of airways) and direct visual access of hollow cavities having diameters smaller than 1 millimeter or having tortuous approach routes. Submillimeter fiberscope can be used to visualize small luminal structures, such blood vessels, biliary ducts, bronchioles, uterine tubes, ureters, and others. Fiberscopes as described herein can be used as accessories to larger endoscopes by being advanced through an auxiliary port. Access to the inner ear canal would also be beneficial especially during cochlear implant surgery. Here an ultra micro endoscope could be used to guide the implant into the cochlear under direct visual guidance, possibly providing for a faster and more accurate installation.

Optical fiber bundles modified as described herein may be used in spectroscopy with, for example, a single outer channel or multiple discrete channels.

Fiberscopes and method for preparing optical fiber bundles have applications outside medicine as well. For example, the exposure/etching technique described herein can be used to created multiple channels within a fiber bundle to provide a discrete array of optical communication pipelines. Each channel would include hundreds to thousands of individual fibers and thereby provide a high degree of redundancy.

EXAMPLE

The following example is provided to illustrate one particular embodiment of a fiberscope as described herein. It is not intended to limit the scope of the claims.

A prototype fiberscope was built using an 0.5 mm-diameter imaging fiber bundle (Fujikura, Japan & Sumitomo, New York), a 0.35 mm distal imaging GRIN lens (NSG America, N.J.), proximal viewfinder (Thorlabs, N.J.) and a novel angled LED light injection system for illumination.

Construction of the prototype fiberscope endoscope included the following: chemically etching the coherent multi-mode fiber bundle to create an exposed length, polishing of the proximal and distal ends, mounting the fiber bundle inside the illumination system, and mounting the GRIN objective lens to the distal end.

Etching Process:

Hydro Fluoric (HF) acid was used for etching the periphery of the fiber bundle. HF acid has been previously used for etching the tips of fibers and fiber bundles for construction of bio-probes, reducing the distal end of fibers to a fine point. However, here HF was used for uniformly etching the circumference of a fiber bundle between the proximal and distal ends of the bundle, to expose the peripheral fibers. Once exposed, light can be injected into and able to travel down the fiber bundle, producing a homogenous ring light at the distal and proximal ends.

To begin, the proximal and distal ends of the bundle were coarsely polished; this helped with determining when to stop the etching process, through direct visualization at the distal end, of the propagation of light towards the center of the imaging bundle. The region of the fiber bundle undergoing the etching process was cleaned with acetone, to remove the silicon resin present on most fiber bundles that would otherwise prohibit the etching process, and ensures uniform etching. The proximal end was then placed inside a 60 ml syringe mounted upside down with a clamp holding the syringe and the fiber, as shown schematically in FIG. 2 and as actually carried out in FIG. 3.

Figure 2:
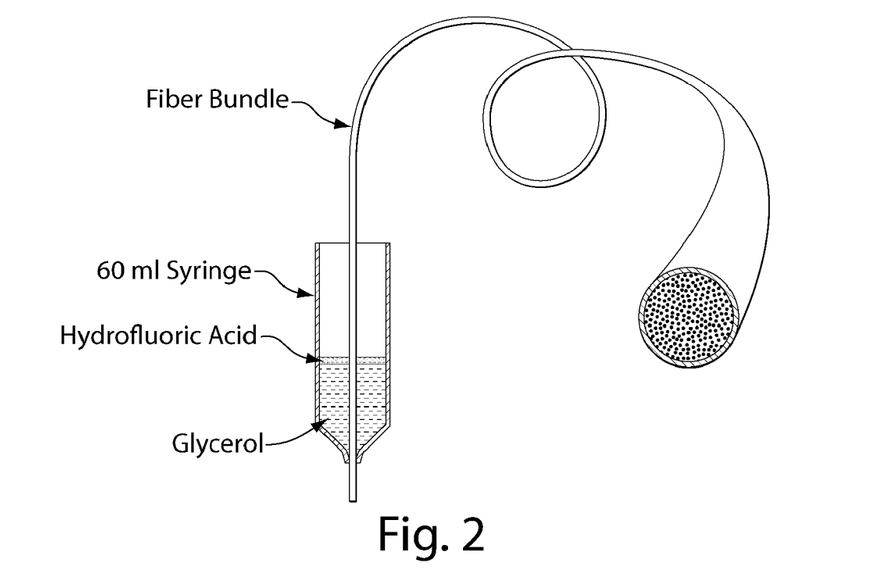
FIG. 2 schematically depicts a set-up for chemically etching an optical fiber bundle.
Figure 3:
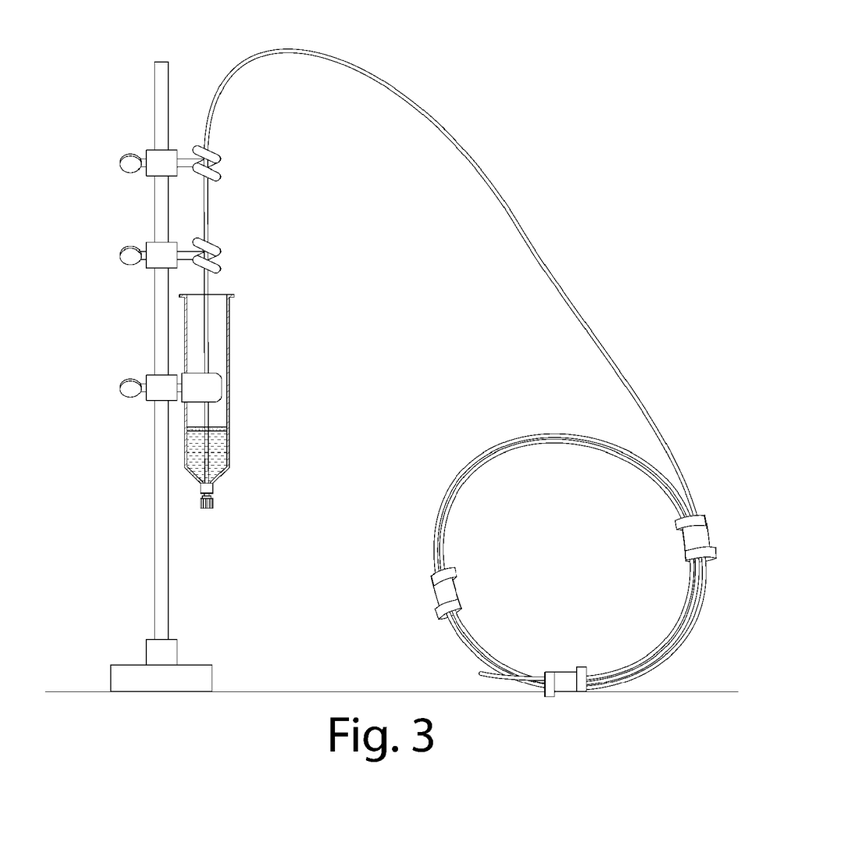
FIG. 3 is a photograph of an exemplary etching set-up.

Glycerol, an inert oil, was poured into the 60 ml syringe up until the point where the etching was to be performed, with care taken not to spill the Glycerol onto the fiber or walls of the syringe. Once the glycerol had settled, 1.5 mL of HF acid (48 wt. % in $H_2O$) was then gently poured into the syringe (alternatively, it could be injected from another syringe). The volume of HF acid and the internal diameter of the syringe determine the length of the fiber exposed to the etching process; the concentration determines the duration of exposure to achieve a given etching depth. In the 60 ml syringe, 1.5 mL of HF acid produced an etched length of 4-5 mm, providing sufficient room for subsequent injection of light for illumination. A snake light source was setup so that the light was aimed at the fiber just above the Glycerol, where the etching took place. FIG. 2 represents the final setup. The light from the snake light was used to monitor progress of the etching, as described below.

The proximal end of the fiber was connected to a microscope (alternatively to an optical viewfinder), which was used to observe the light from the snake light source transmitting down the peripheral fibers as the propagation of the etching occurred.

In this prototype process using a 0.5 mm fiber bundle, the light began to be visible at the distal face in approximately 15 minutes and propagated towards the center at approximately 5 microns per minute.

Once the appropriate thickness 'ring light' was achieved, the distal end of the fiber was raised out of the 60 ml syringe and washed with distilled water, followed by immersion in distilled water for 10 minutes. The fiber was then removed and allowed to air dry.

Figure 4:
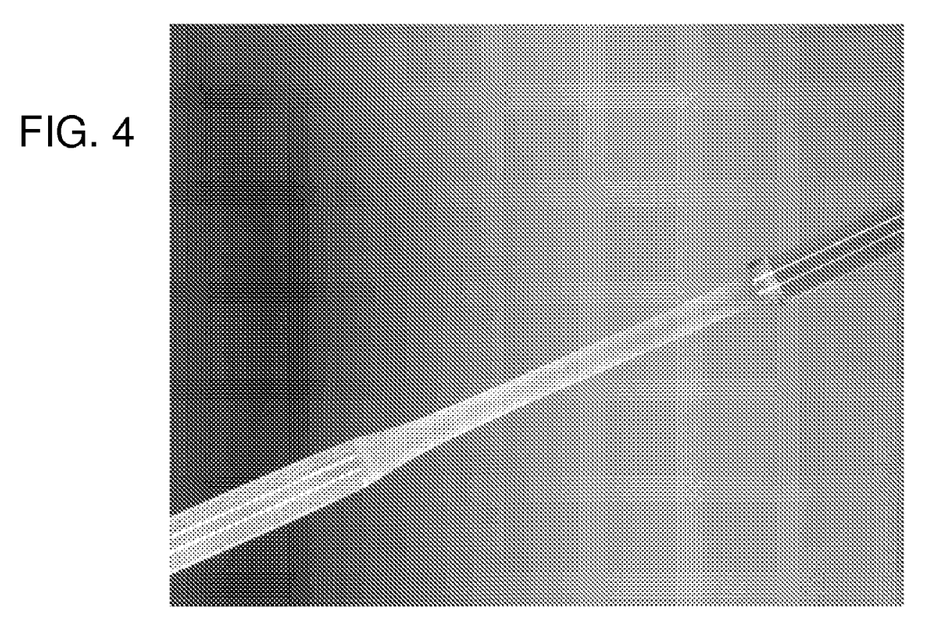
FIG. 4 is a photograph of an exemplary etched region of a fiber bundle.

FIG. 4 represents a magnified image of the etched area, showing the gradual etching process at both the proximal end and the distal end. The smooth taper is a result of the meniscus created by the HF acid with the fiber at the distal end.

The etched fibers exposed on the proximal end were sealed using black heat shrink tube, eliminating light transmission towards the viewfinder.

Figure 5:
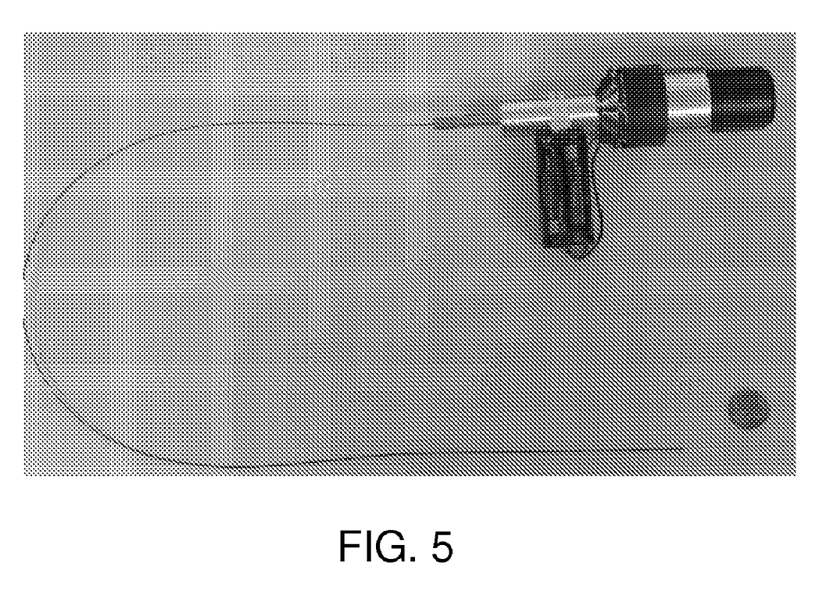
FIG. 5 is a photograph of an exemplary prototype fiberscope.

Light Source:

An LED illumination system was developed for injecting light into the etched peripheral fibers. The system includes six 3 mm super bright LEDs (Superbrightleds, St Louis) with luminescence ratings of 3000 mcd each. The LEDs are equally spaced and directed towards the exposed etched fibers at an angle of incidence of 45 degrees (the angle may vary as needed). The distance between the face of the LEDs and the exposed fibers was kept to a practical minimum to avoid light waste, ~1 mm. The LEDs are mounted on a frame; for the prototype, a frame was made through machining a single 1.5-inch diameter aluminum rod. A photograph of the prototype is shown in FIG. 5.

The brightness of the LEDs can be controlled using a simple Pulse Width Modulator circuit.

GRIN Lens Mounting

Figure 6:
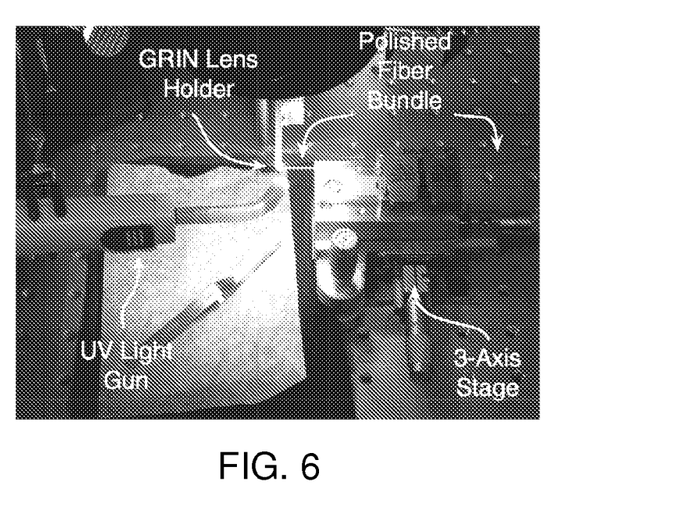
FIGS. 6-7 are photographs of an exemplary set-up for attaching an objective lens.

The distal end of the fiber bundle was gently polished using a series of polishing sheets. The fiber was then mounted onto a Newport 561D-XYZ stage via a gimbal mount and fiber chuck. A Thorlabs GRIN holder was then mounted perpendicular to the Newport stage, to hold the GRIN lens directly in front of the distal end of the fiber bundle as shown in FIG. 6.

Figure 7:
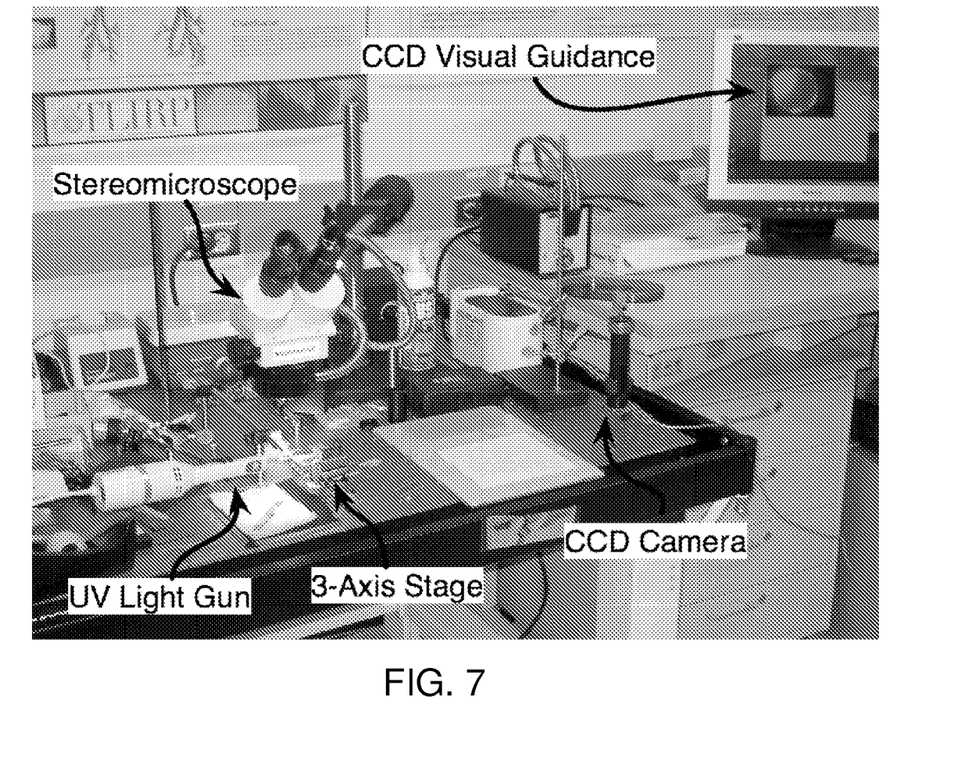

Under direct vision of a stereomicroscope the fiber was positioned and aligned as close to the GRIN lens as practically possible. Visual feedback of the alignment was also confirmed through the fiber bundle viewfinder optics and CCD camera system, as shown in FIG. 7.

Figure 8:
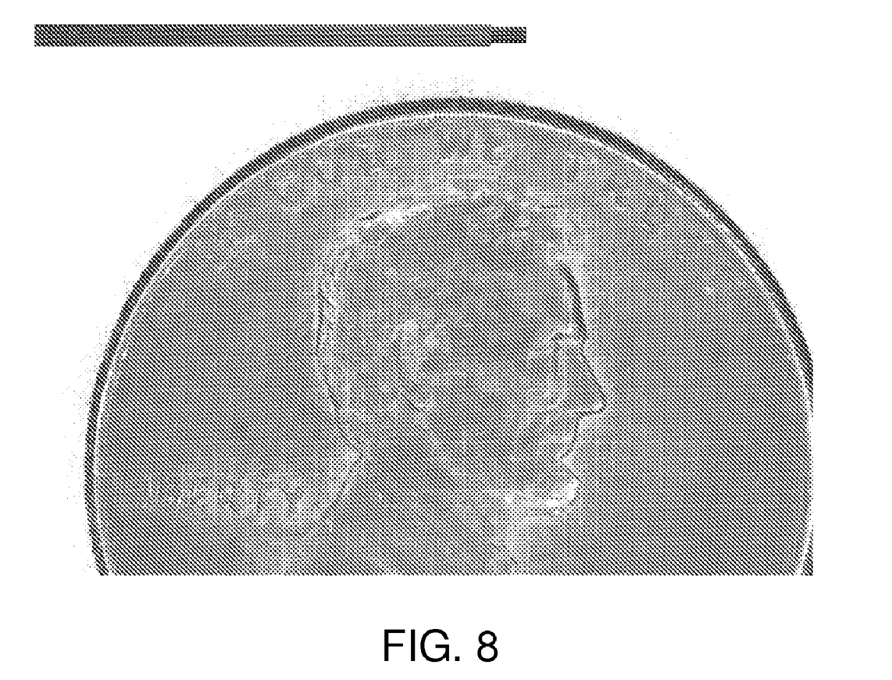
FIG. 8 is a photograph of the distal end of an exemplary fiberscope with a U.S. cent for scale.
Figure 9:
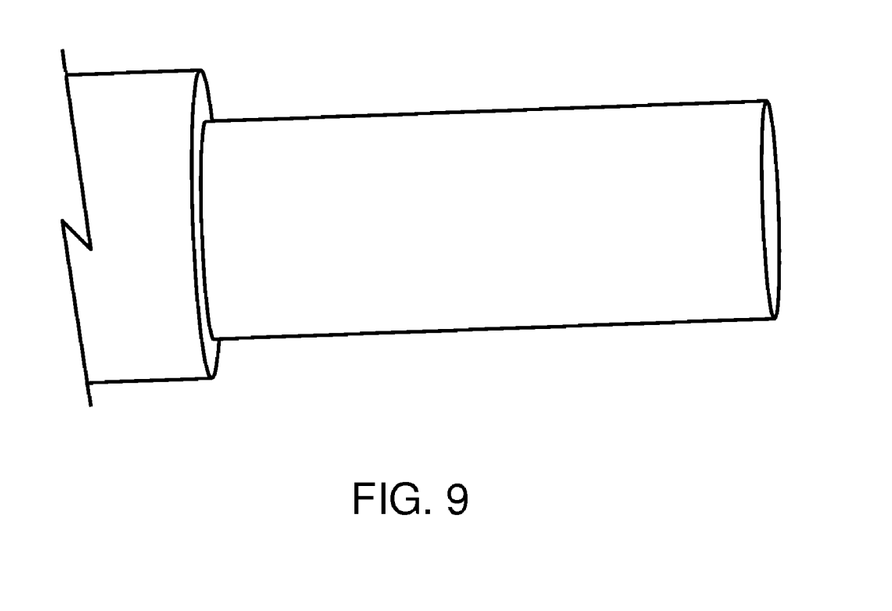
FIG. 9 is a photograph showing detail of the distal tip in FIG. 8.

Once alignment was confirmed, the fiber was slightly retracted using the Newport stage, and a spot of Norland 61 UV glue was applied to the end of the GRIN lens. The fiber was then brought back into position and contact was made with the lens. Once alignment was re-confirmed using the CCD optical viewfinder, UV light from a high intensity source was used to cure the glue. FIG. 8 shows the final distal end with mounted GRIN lens against a U.S. cent for scale; a further magnified view is provided in FIG. 9.

Fiberscope as described can be miniaturized down to the smallest commercial imaging fiber bundle and GRIN objective lens combination, currently 300 microns in diameter.

The etching process is relatively fast (30 min) and can be easily adapted for mass production. Additionally, the technique could be used to manufacture larger fiber optic endoscopes with significant reduction in cost and improvement of flexibility.

We claim:

1. A fiberscope comprising:
an elongate imaging fiber bundle having a circumference, a proximal end, and a distal end, and comprising:
a plurality of elongate optical fibers coherently arranged in the bundle, the plurality including peripheral fibers at a periphery of the bundle and deep fibers deep to the peripheral fibers; and
a coating surrounding the plurality of fibers;
wherein an exposed length of the bundle, intermediate the proximal and distal ends, is denuded of the coating, and peripheral fibers are so severed in the exposed length as to permit injection of light into the peripheral fibers at the exposed length; and
a light source so positioned with respect to the exposed length of the bundle as to inject light into the peripheral fibers at the exposed length.

2. The fiberscope of claim 1, wherein the bundle is denuded of coating, and the peripheral optical fibers are severed, around the entire circumference of the bundle in the exposed length.

3. The fiberscope of claim 1, wherein the exposed length is up to 10 mm in length.

4. The fiberscope of claim 3, wherein the exposed length is about 4 mm to about 5 mm in length.

5. The fiberscope of claim 1, wherein severed optical fibers are optically sealed proximal to the exposed length.

6. The fiberscope of claim 1, further comprising an objective lens so sized, shaped, and positioned at the distal end of the bundle as to direct received light into deep fibers and not into peripheral fibers, and not to obscure light emitted from peripheral fibers.

7. The fiberscope of claim 6, further comprising a viewing assembly so positioned at the proximal end of the bundle as to receive light from deep fibers.

8. The fiberscope of claim 6, wherein the objective lens comprises a gradient index lens or micro lens objective.

9. The fiberscope of claim 1, wherein the light source comprises an array of light emitters distributed about the exposed length.

10. The fiberscope of claim 9, wherein the light emitters each comprise a light emitting diode.

11. The fiberscope of claim 10, wherein the bundle is devoid of coating, and the peripheral optical fibers are severed, around the entire circumference of the bundle in the exposed length, and the light emitting diodes are arranged in a ring around the exposed length.

12. The fiberscope of claim 11, wherein the exposed length is about 4 mm to about 5 mm in length, the bundle has at most one exposed length, and the fiberscope further comprises (a) a gradient index objective lens so sized, shaped, and positioned at the distal end of the bundle as to direct received light into deep fibers and not into peripheral fibers, and not to obscure light emitted from peripheral fibers, and (b) a viewing assembly so positioned at the proximal end of the bundle as to receive light from deep fibers.

13. The fiberscope of claim 1, wherein the bundle has at most one exposed length.

14. The fiberscope of claim 1, wherein the exposed length is optically insulated from a second exposed length defined by the bundle.

15. The fiberscope of claim 14, wherein the second exposed length is positioned along the bundle proximal to the exposed length and extends deeper into the bundle than the exposed length.

16. The fiberscope of claim 1, wherein the exposed length is chemically etched to be denuded of the coating and the peripheral fibers to be severed.

17. The fiberscope of claim 16, wherein the exposed length is etched with hydrofluoric acid.

18. An elongate imaging fiber bundle having a circumference, a proximal end, and a distal end, and comprising:
  a plurality of elongate optical fibers coherently arranged in the bundle, the plurality including peripheral fibers at a periphery of the bundle and deep fibers deep to the peripheral fibers; and
  a coating surrounding the plurality of fibers;
  wherein an exposed length of the bundle, intermediate the proximal and distal ends, is chemically etched to be denuded of the coating, and peripheral fibers are so severed as to permit injection of light into the peripheral fibers at the exposed length.

19. A method of making the elongate imaging fiber bundle of claim 18, comprising:
  exposing a length of the bundle, intermediate the proximal and distal ends, to an etching chemical at an etching chemical concentration for a period of time, the period of time, the etching chemical, and the etching chemical concentration selected to denude the coating and sever peripheral fibers in the length to a desired depth, thereby forming the exposed length.

20. The method of claim 19, further comprising optically sealing the severed peripheral fibers proximal to the exposed length.

* * * * *